(12) United States Patent
Itabashi et al.

(10) Patent No.: US 7,038,430 B2
(45) Date of Patent: May 2, 2006

(54) POWER CONTROL CIRCUIT

(75) Inventors: Toru Itabashi, Anjo (JP); Takanori Ishikawa, Chita-gun (JP); Toshiyuki Iwasaka, Kariya (JP); Yukihide Niimi, Chita-gun (JP)

(73) Assignee: Denso Corporation, Kariya (JP)

(*) Notice: Subject to any disclaimer, the term of this patent is extended or adjusted under 35 U.S.C. 154(b) by 181 days.

(21) Appl. No.: 10/678,129

(22) Filed: Oct. 6, 2003

(65) Prior Publication Data

US 2004/0075423 A1 Apr. 22, 2004

(30) Foreign Application Priority Data

Oct. 22, 2002 (JP) ............... 2002-307431

(51) Int. Cl.
*G05F 1/613* (2006.01)
(52) U.S. Cl. .................. 323/224; 323/266; 323/285
(58) Field of Classification Search ............. 323/222, 323/224, 225, 266, 271, 284, 285; 363/55
See application file for complete search history.

(56) References Cited

U.S. PATENT DOCUMENTS

| | | | | |
|---|---|---|---|---|
| 4,024,451 A | * | 5/1977 | Nishino et al. | 363/55 |
| 5,808,453 A | * | 9/1998 | Lee et al. | 323/224 |
| 5,866,957 A | * | 2/1999 | Baba et al. | 323/266 |
| 6,674,657 B1 | | 1/2004 | Nagaya et al. | |

FOREIGN PATENT DOCUMENTS

| | | |
|---|---|---|
| JP | A-H03-136112 | 6/1991 |
| JP | A-H05-130730 | 5/1993 |
| JP | H-05-127765 | 5/1993 |
| JP | A-H06-335238 | 12/1994 |
| JP | A-H08-44443 | 2/1996 |
| JP | A-H09-37545 | 2/1997 |
| JP | A-H10-304596 | 11/1998 |
| JP | A-2000-139023 | 5/2000 |
| JP | A-2001-268895 | 9/2001 |

\* cited by examiner

*Primary Examiner*—Jessica Han
(74) *Attorney, Agent, or Firm*—Posz Law Group, PLC

(57) ABSTRACT

A power control circuit includes a switching regulator for converting voltage of external electric power into a medium voltage, a series regulator for converting the medium voltage to a prescribed voltage of output power to be supplied and a circuit for operating either the switching regulator or the series regulator under a protective condition if overvoltage or overcurrent is detected. The switching regulator includes a first transistor, a smoothing circuit and a first control circuit for controlling switching operation of the first transistor. The series regulator includes a second transistor and a second control circuit for controlling conductivity of the second transistor to regulate voltage of the output power to be constant, an overvoltage detecting circuit for detecting an overvoltage of the medium voltage, and an overcurrent detecting circuit for detecting an overcurrent supplied to the series regulator.

16 Claims, 3 Drawing Sheets

POWER CONTROL CIRCUIT

CROSS REFERENCE TO RELATED APPLICATION

The present application is based on and claims priority from Japanese Patent Application 2002-307431, filed Oct. 22, 2002, the contents of which are incorporated herein by reference.

BACKGROUND OF THE INVENTION

1. Field of the Invention

The present invention relates to a power control circuit of an on-vehicle electronic controller and, particularly, a power control circuit composed of a switching regulator and a series regulator.

2. Description of the Related Art

A power control circuit that is constituted of a switching regulator or a series regulator has been known, and disclosed in patents, such as JP-A-9-37545. In such a power control circuit, voltage of an external power source is reduced to supply stable electric power at a desired voltage.

The switching regulator includes a switching transistor which is connected in series with a power source, and switches the switching transistor on and off to supply necessary power to a smoothing circuit. This switching regulator can operate at low and favorable power consumption but at low and unfavorable control accuracy.

On the other hand, the series regulator includes a power transistor which is connected in series with a power source to control the conductivity of the power transistor so that the transistor output voltage to be supplied to a smoothing circuit can be regulated. This series regulator can operate at high and favorable accuracy but at high and unfavorable power consumption.

JP-A-6-335238 discloses a composite control circuit in which the switching regulator and the series regulator are connected in series. The switching regulator reduces voltage of an external power source to a medium voltage that is slightly higher than a desired voltage at low power consumption, and the series regulator reduces the medium voltage to a desired voltage at high accuracy.

However, if an excessive amount of current or overcurrent flows in the series regulator by accident, the switching regulator of the above composite control circuit may not stably operate without a protection circuit, which is expensive and bulky.

SUMMARY OF THE INVENTION

A main object of the invention is to provide an improved power control circuit which can solve the above-described problem.

Another object of the invention is to provide an improved power control circuit composed of a switching regulator and a series regulator which is resistive to overcurrent, overvoltage and also overheating.

According to a main feature of the invention, a power control circuit includes a switching regulator for converting voltage of external electric power into a medium voltage, a series regulator for converting the medium voltage to a prescribed voltage of output power to be supplied, and protecting means for operating one of the switching regulator and the series regulator under a protective condition if one of the overvoltage and overcurrent is detected. The switching regulator includes a first transistor, a smoothing circuit connected to the first transistor and a first control circuit for controlling switching operation of the first transistor. The series regulator includes a second transistor and a second control circuit for controlling conductivity of the second transistor to regulate voltage of the output power to be constant, an overvoltage detecting circuit for detecting an overvoltage of the medium voltage, and an overcurrent detecting circuit for detecting an overcurrent supplied to the series regulator. Because the overvoltage detecting circuit detects the medium voltage, surge pulses coming from outside are absorbed by the smoothing circuit of the switching regulator and may not badly affect the protecting means or operation of the switching regulator or the series regulator.

In the above power control circuit, the protecting means turns off the first transistor if the overvoltage detecting circuit detects voltage higher than a prescribed threshold level. Preferably, the protecting means turns off either the second transistor if the overvoltage detecting circuit detects voltage higher than a prescribed threshold level, or the first transistor if the overcurrent detecting circuit detects current larger than a prescribed threshold level. The protecting means may turn off the second transistor if the overcurrent detecting circuit detects current larger than a prescribed threshold level.

The power control circuit may further include a feedback circuit connected between the overvoltage detecting circuit and the first control circuit, in which the overvoltage detecting circuit includes a voltage dividing circuit for dividing an output voltage of the switching regulator, and connected to the feedback circuit.

The power control circuit may further comprises an overheat detecting circuit for detecting overheating of the first transistor, in which the protecting means operates either the switching regulator, or the series regulator under a protective condition if the overheat detecting circuit detects overheating of the first transistor. The protecting means may operates the first control circuit to turn off the first transistor if the overheat detecting circuit detects the temperature of the first transistor to be higher than a threshold temperature level. The protecting means may operate the second control circuit to turn off the second transistor if the overheat detecting circuit detects the temperature of the first transistor to be higher than a threshold temperature level. The overheat detecting circuit may include a current source and a diode which is disposed near the first transistor and connected to the current source, in which the overheating of the first transistor is detected if the forward voltage of the diode becomes higher than a threshold voltage level.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 4A, 4B, 4C, 4D, 4E and 4F are voltage and current waveforms at various portions of the power control circuit in

DETAILED DESCRIPTION OF THE PREFERRED EMBODIMENTS

Figure 1:
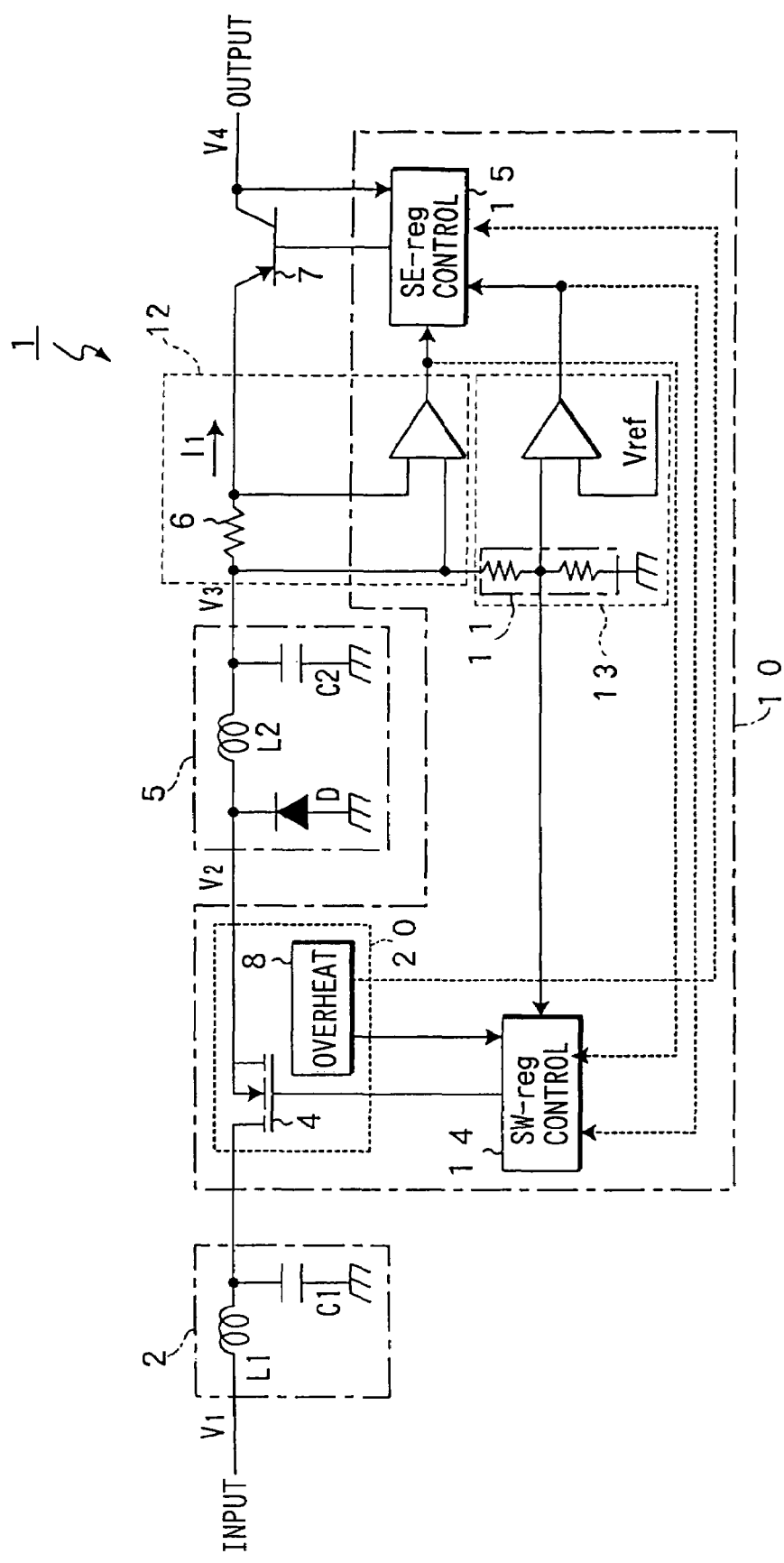
FIG. 1 is a circuit diagram of a power control circuit according to a preferred embodiment of the invention.

An electronic control apparatus that includes a power control circuit according to a preferred embodiment, which is shown in FIG. 1, will be described with reference to FIG. 2.

Figure 2:
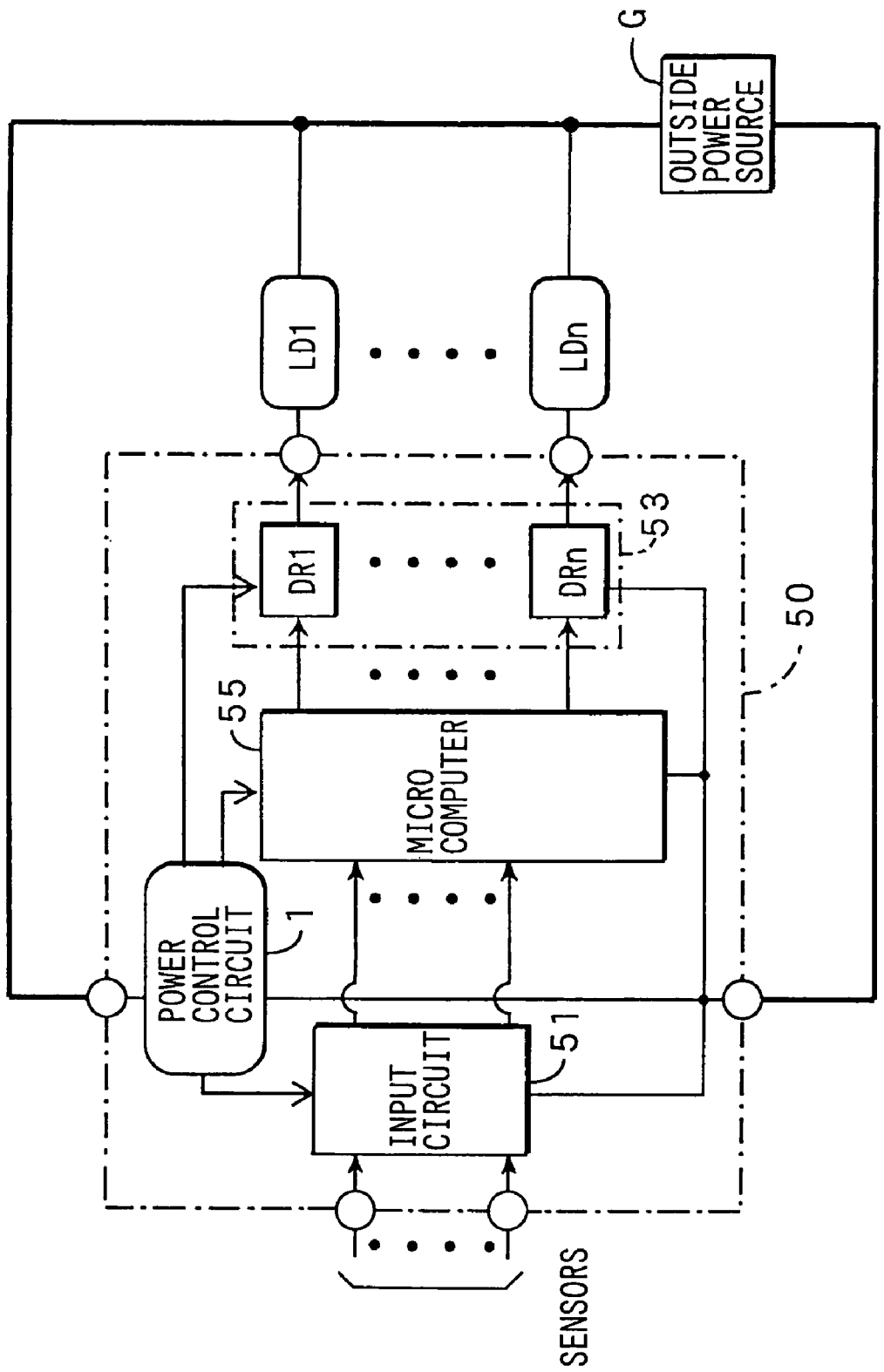
FIG. 2 is a block diagram of an on-vehicle electronic control apparatus.

As shown in FIG. 2, the electronic control apparatus 50 is constituted of the power control circuit 1, an input circuit 51, a drive circuit unit 53 and a microcomputer 55. The input circuit 51 is connected to various sensors and includes a filter and/or an A/D converter to take in various signals from the sensors. The drive circuit unit 53 includes a plurality of drive circuits Dr1–Drn which are respectively connected to outside electronic devices LD1–LDn. The microcomputer 55 is connected between the input circuit 51 and the drive circuit unit 53 to control the drive circuits Dr1–Drn according to the signals from the sensors. The power control circuit 1 is powered by an outside power source G to supply the input circuit 51, the drive circuit unit 53 and the microcomputer 55 with electric power of prescribed voltage.

The voltage (e.g. 12 V) of the electric power supplied from the outside power source G is much higher than the output voltage of the power control circuit 1 so that stable electric power of a constant voltage (e.g. 5 V) can be supplied to the above-described circuits 51, 53, 55.

As shown in FIG. 1, the power control circuit 1 includes a lowpass filter 2, a MOSFET 4, a smoothing circuit 5, a bipolar transistor 7, an overheat detecting circuit 8, a current detecting circuit 12, an overvoltage detecting circuit 13, an SW-reg control circuit 14 and an SE-reg control circuit 15. The FET 4, the overheat detecting circuit 8, the voltage dividing circuit 11, the overvoltage detecting circuit 13, the SW-reg control circuit 14, the SE-reg control circuit 15 are integrally formed on a regulator IC 10.

The lowpass filter 2 is constituted of a coil L1 and a capacitor C1 and removes high frequency noises flowing from the outside power source. The smoothing circuit 5 includes a diode D, a coil L2, a capacitor C2 and smoothes the output voltage of the FET 4. The overheat detecting circuit 8 includes a constant current circuit and a temperature sensing diode which is disposed near the FET 4. The overheat detecting circuit 8 detects the forward voltage of the temperature sensing diode to thereby detect overheating of the FET 4. The current detecting circuit 12 includes a current detecting resistor 6 and an operational amplifier and detects the voltage across the current detecting resistor 6 and current 11 flowing through the same. The overvoltage detecting circuit 13 includes a voltage dividing circuit 11 and a comparator which compares the voltage divided by the voltage dividing circuit 11 with a reference voltage Vref to detect an overvoltage. The voltage dividing circuit 11 divides the output voltage V3 of the smoothing circuit 5. The SW-reg control circuit 14 controls the duty ratio of the gate voltage of the FET 4 so that the voltage divided by the voltage dividing circuit 11 can be kept constant. The SW-reg control circuit 14 also controls the gate voltage of the FET 4 to turn off when the overheat detecting circuit 8 detects overheating of the FET 4. The SW-reg control circuit 14 forms a switching regulator together with the FET 4 and the smoothing circuit 5. The SE-reg control circuit 15 controls the base current of the transistor 7 so that the output voltage of the transistor 7 can be kept constant. The SE-reg control circuit 15 also controls the base current of the transistor 7 to control the output current when the current detecting circuit 12 detects overcurrent and to turn off the transistor 7 when the overvoltage detecting circuit 13 detects overvoltage. The SE-ref control circuit forms a series regulator together with the transistor 7.

In the above-described power control circuit 1, high frequency noises of input power are removed by the lowpass filter 2, and medium voltage V3, which is lower than the input voltage, is provided by the switching regulator that is constituted of the FET 4, the smoothing circuit 5 and the SW-reg control circuit 14. The medium voltage V3 is further reduced by the series regulator that is constituted of the transistor 7 and the SE-reg control circuit 15 to provide supply voltage V4.

Figure 3A:
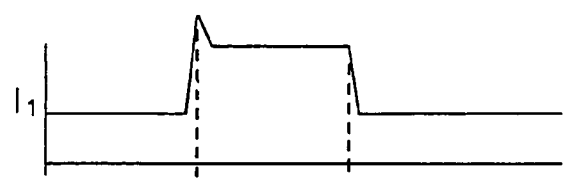
FIGS. 3A and 3B are time charts showing current and voltage waveforms of the power control circuit when abnormal current flows in the power control circuit.
Figure 3B:
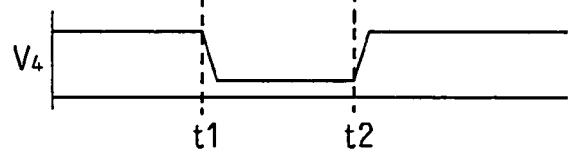

If overcurrent or a big surge pulse flows in the power control circuit 1 due to a short-circuit or some other accident is detected by the current detecting circuit 12 at time t1, the SE-reg control circuit 15 reduces the base current of the transistor 7, as shown in FIGS. 3A and 3B. As a result, the supply voltage V4 of the transistor 7 under control is lowered to control the output current 11.

After the overcurrent is removed at time t2, the SE-reg control circuit 15 returns to its normal control operation.

Figure 4A:
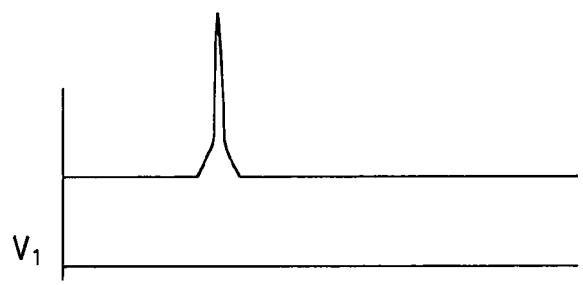
Figure 4B:
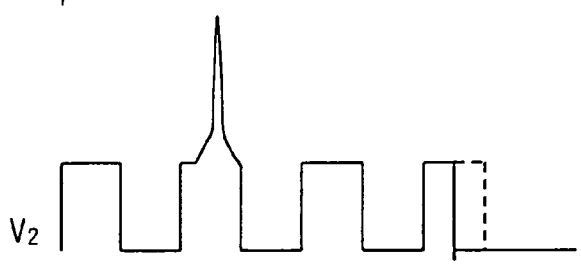
Figure 4C:
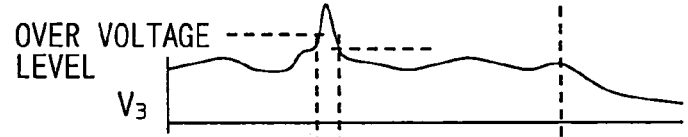

If an overvoltage is applied to the power control circuit 1 through a power line at time t11 and the output voltage V3 of the switching regulator circuit is boosted up as shown in FIGS. 4A, 4B and 4C, the overvoltage detecting circuit 13 sends a signal to the SE-reg control circuit 15, which cuts off the base current of the transistor 7.

Figure 4D:
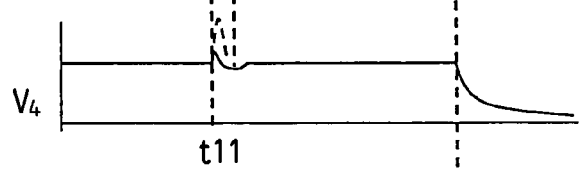

Thereafter, the SW-reg control circuit 14 controls the gate voltage of the FET 4. If the output voltage V3 of the switching regulator circuit lowers and the output voltage of the voltage dividing circuit 11 becomes lower than the reference voltage Vref of the overvoltage detecting circuit 13, the SE-reg control circuit 15 returns to its normal driving operation to keep the supply voltage V4 constant, as shown in FIG. 4D. Incidentally, the reference voltage Vref can be changed by providing the comparator of the overvoltage detecting circuit 13 with a hysteresis to detect whether the output voltage V3 returns to normal or not. It is also possible to detect the recovery by measuring a recovering time which is set beforehand. The surge pulses except very big surge pulses are usually removed when it passes through the filter 2, the FET 4 and the smoothing circuit 5.

Figure 4E:
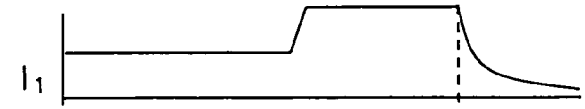
Figure 4F:
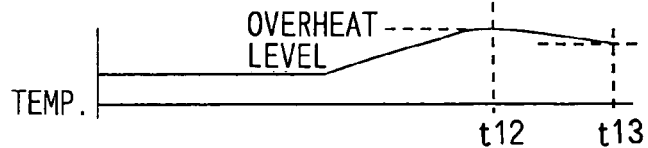

If a half shortcircuit accident takes place in the power line and an abnormal amount of current that is not so large as the amount to be detected by the current detecting circuit 12 flows for a certain period of time as shown in FIG. 4E, the FET 4 is heated and the temperature of the FET 4 rises to a highest allowable level (overheat level). The SW-reg circuit 14 turns off the FET 4 at time t12 if the temperature detecting circuit 8 detects such a temperature rise of the FET 4, as shown in FIG. 4F.

Thereafter, the normal on-off control operation of the SW-reg control circuit 14 resumes when the temperature of the FET 4 lowers to an allowable level or after a time period for the FET 4 to cool down passes, at time t13.

The FET 4 and the transistor 7 can be respectively controlled by the SW-reg circuit 14 and the SE-reg circuit 15 according to various signals from portions of the power control circuit 1, as shown in dotted lines in FIG. 1.

The overheat detecting circuit 8 may include an overheat determining circuit for directly controlling the FET 4. The FET 4 and the overheat detecting circuit 8 can be separated from the regulator IC 10 and integrated together into a chip 20, which is encircled by a dotted line in FIG. 1. The regulator IC 10 may also include the bipolar transistor 7. The regulator IC 10 may include a plurality of transistors 7 and a corresponding number of SE-reg circuits 15 that is jointly controlled by the current detecting circuit 12 and the overvoltage detecting circuit 13. In this case, each composite circuit including the transistor 7 and the overheating circuit 15 is connected to the output side of the current detecting resistor 6.

The regulator IC 10 may also include a plurality of the current detecting circuits 12 and the corresponding transistors 7 connected thereto, and a corresponding number of SW-reg circuits 14 that is jointly controlled by the overvoltage detecting circuit 13. In this case, each the current detecting resistor 6 is series-connected to the output side of the smoothing circuit 5.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A power control circuit comprising:
    a switching regulator for converting voltage of external electric power into a medium voltage, said switching regulator including a first transistor, a smoothing circuit connected to the first transistor and a first control circuit for controlling switching operation of the first transistor;
    a series regulator for converting the medium voltage to a prescribed voltage of output power to be supplied, said series regulator including a second transistor and a second control circuit for controlling conductivity of the second transistor to regulate voltage of the output power to be constant, an overvoltage detecting circuit for detecting an overvoltage of the medium voltage, and an overcurrent detecting circuit for detecting an overcurrent supplied to said series regulator; and
    means for operating one of said switching regulator and said series regulator under a protective condition if one of the overvoltage and overcurrent is detected,
    wherein said means turns off the first transistor if the overvoltage detecting circuit detects voltage higher than a prescribed threshold level and controls the second transistor to limit current flowing through the second transistor if the overcurrent detecting circuit detects current larger than a prescribed current level.

2. The power control circuit as claimed in claim 1, further comprising an IC chip for accommodating one of the first and second transistors.

3. The power control circuit as claimed in claim 1, wherein said means turns off the second transistor if the overvoltage detecting circuit detects voltage higher than a prescribed threshold level.

4. The power control circuit as claimed in claim 1, wherein said means turns off the first transistor if the overcurrent detecting circuit detects current larger than a prescribed threshold level.

5. The power control circuit as claimed in claim 1, wherein said means turns off the second transistor if the overcurrent detecting circuit detects current larger than a prescribed threshold level.

6. The power control circuit as claimed in claim 1, further comprising a feedback circuit connected between the overvoltage detecting circuit and the first control circuit,
    wherein said overvoltage detecting circuit includes a voltage dividing circuit for dividing an output voltage of said switching regulator, and connected to said feedback circuit.

7. The power control circuit as claimed in claim 1, further comprising an overheat detecting circuit for detecting overheating of the first transistor,
    wherein said means operates one of said switching regulator and said series regulator under a protective condition if said overheat detecting circuit detects overheating of the first transistor.

8. The power control circuit as claimed in claim 7, said means operates said first control circuit to turn off the first transistor if said overheat detecting circuit detects the temperature of the first transistor to be higher than a threshold temperature level.

9. The power control circuit as claimed in claim 7, said means operates said second control circuit to turn off the second transistor if said overheat detecting circuit detects the temperature of the first transistor to be higher than a threshold temperature level.

10. The power control circuit as claimed in claim 7,
    wherein said overheat detecting circuit comprises a current source and a diode which is disposed near the first transistor and connected to the current source, and
    wherein the overheating of the first transistor is detected if the forward voltage of the diode becomes higher than a threshold voltage level.

11. The power control circuit as claimed in claim 1, further comprising an overheat detecting circuit for detecting overheating of the first transistor,
    wherein said means includes a circuit for interrupting the output power of the first transistor if said overheat detecting circuit detects overheating of the first transistor.

12. The power control circuit as claimed in claim 1, further comprising an additional series regulator that includes an additional second control circuit.

13. The power control circuit as claimed in claim 12, further comprising an additional overcurrent detecting circuit connected to said additional series regulator.

14. The power control circuit as claimed in claim 1,
    wherein the first transistor comprises a MOSFET having a gate, and
    wherein the first control circuit comprises a circuit for controlling a duty ratio of the gate voltage of the MOSFET.

15. The power control circuit as claimed in claim 1,
    wherein the second transistor comprises a bipolar transistor leaving a base circuit, and
    wherein the second control-circuit comprises a circuit for controlling an amount of current flowing through the base circuit of the bipolar transistor.

16. The power control circuit as claimed in claim 1, further comprising an IC chip for accommodating all elements of said power source.

* * * * *